(12) United States Patent
Rank

(10) Patent No.: US 6,176,635 B1
(45) Date of Patent: Jan. 23, 2001

(54) FRICTIONAL COUPLING OR BRAKE

(75) Inventor: Robert Rank, Vilgertshofen-Stadl (DE)

(73) Assignee: Hoerbiger Antriebstechnik GmbH, Schongau (DE)

(*) Notice: Under 35 U.S.C. 154(b), the term of this patent shall be extended for 0 days.

(21) Appl. No.: 09/260,128

(22) Filed: Mar. 1, 1999

(30) Foreign Application Priority Data

Mar. 3, 1998 (AT) ......................................... 370/98

(51) Int. Cl.⁷ ..................................................... F16D 13/00
(52) U.S. Cl. ............................. 403/12; 403/404; 74/339; 192/53.34
(58) Field of Search ................................. 403/11, 12, 404, 403/375, 373, 334, 291; 192/53.34; 74/339

(56) References Cited

U.S. PATENT DOCUMENTS

| | | | |
|---|---|---|---|
| 4,314,627 | * | 2/1982 | Nozawa ............................ 192/53.34 |
| 4,931,117 | * | 6/1990 | Muller et al. ................. 192/53.34 X |
| 5,038,628 | * | 8/1991 | Kayama ................................. 74/339 |
| 5,113,986 | * | 5/1992 | Frost ................................. 192/53.34 |
| 5,143,192 | * | 9/1992 | Vojacek et al. ............... 192/53.34 X |
| 5,575,582 | * | 11/1996 | Frastaci et al. ....................... 403/320 |
| 5,850,900 | * | 12/1998 | Takahashi et al. ........... 192/53.34 X |
| 6,014,807 | * | 1/2000 | O ...................................... 29/893.37 |

* cited by examiner

Primary Examiner—Harry C. Kim
(74) Attorney, Agent, or Firm—Dykema Gossett PLLC

(57) ABSTRACT

A frictional coupling, especially synchronization device of gear mechanisms, with at least two coupling bodies (1, 2) which come into frictional contact upon engagement of the coupling, wherein one coupling body consists of one ring-shaped base body (3) of metal with at least one flat, conical or cylindrical carrier surface, to which a frictional layer made of organic or inorganic frictional material (4) is attached, and at least one other coupling body of a counter body (8), preferably also made of metal, and has a counter surface which works together with the frictional layer, is further developed for closed systems such that clamping or damage to the edges can be avoided with continued unimpaired function and the usage in the new condition is facilitated. For this, a wear-material (10, 14, 15) made of paraffin or wax is applied, between the base body and the counter-body, onto at least one part of the surface (4, 9, 11', 3') facing the other coupling body, which material, prior to starting to operate the frictional coupling, keeps the base body (3), especially the frictional layer, from being in contact with the counter-body (8) and closes it for a short time in the first operation during the frictional contact between the coupling bodies (1, 2) through the appearing frictional forces and the generated temperature.

15 Claims, 2 Drawing Sheets

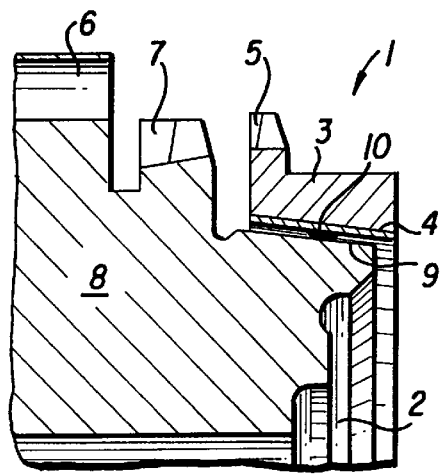
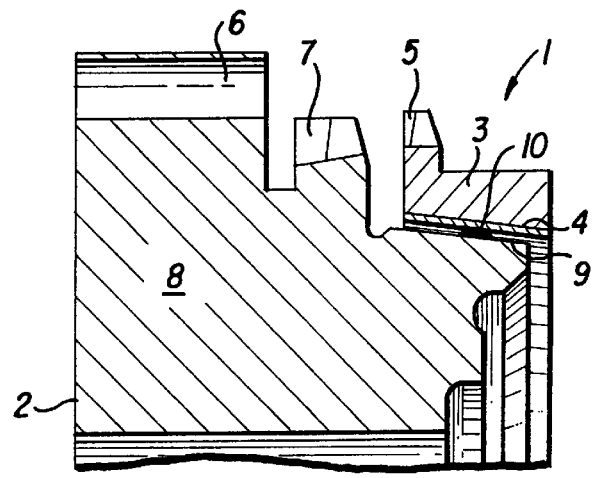
FIG. 1  FIG. 2
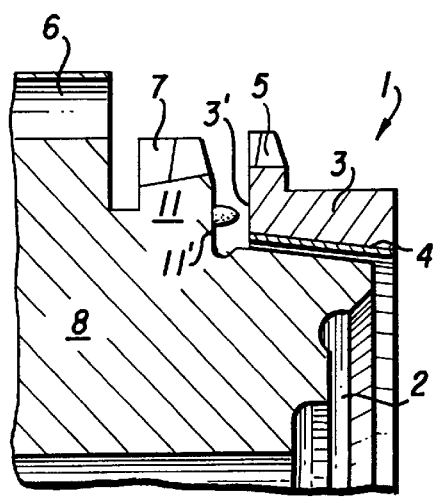
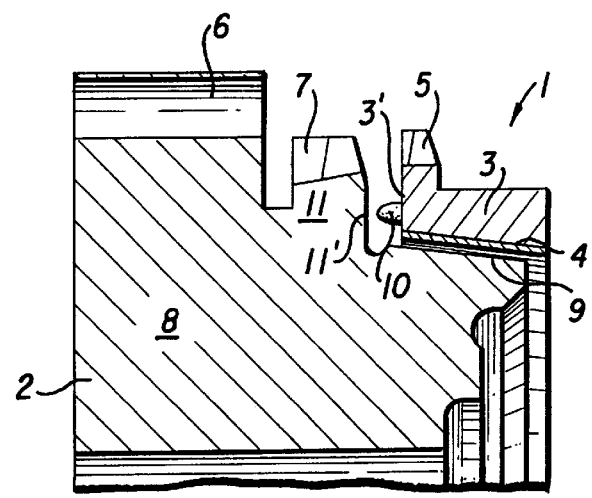
FIG. 3  FIG. 4

FRICTIONAL COUPLING OR BRAKE

BACKGROUND OF THE INVENTION

1. Field of the Invention

The invention relates to a frictional coupling, especially a synchronization device of a gear mechanism, with at least two coupling bodies which come into contact during engagement of the coupling, wherein one coupling body consists of one ring-shaped base body of metal with, at least, one flat, conical or cylindrical carrier surface to which a frictional layer is attached, and at least one other coupling body of a counter body, preferably also made of metal, which has a counter surface which works together with the frictional layer.

2. The Prior Art

Frictional couplings as well as also synchronization devices of this type are already known in various embodiments from multiple sources. They have the object to create a frictional contact between structural parts rotating a different numbers of revolutions and, in such a way, to make the numbers of revolutions the same. Primarily, those types of frictional couplings are used mainly in motorized vehicles for the synchronization of gear mechanisms to facilitate their shifting and the gear change. Especially, conical frictional systems, prior to being put into operation, in installation and in the new condition of the surfaces brought into frictional contact, exhibit high frictional values during frictional contact which are due to the manufacturing condition of the surfaces of the frictional pairing and make the first shifting of the coupling disadvantageously difficult. If the coupling bodies to come into frictional contact with one another are pressed or hit against one another with a large force during transport prior to installation or during installation itself, there can even be clamping or damage to the edges, by which the first shifting movements can be seriously impaired or even made impossible. These disadvantages are only reduced or eliminated after several shifting procedures of the new coupling or of the new synchronization mechanism as soon as the surfaces of the frictional pairing coming into frictional contact are somewhat smoothened off and have come to fit to one another.

A frictional pairing with a thin, quickly-closing insertion layer on one of frictional bodies is described in DE-OS 2 264 275. This insertion layer, however, in an exothermal reaction is said to form conversion products that act like emery, whereas also binding agents can be used which burn or crack and, in so doing, leave carbon residues behind. In so doing, the counter frictional surface are said to be rapidly freed from all impurities and the desired surface quality quickly achieved. As is, however, mentioned later, the substances formed in the insertion process fall out as a strong expulsion substance, so that this solution is only sensible for use in open systems, for example, in brakes. In closed systems such as lubricated frictional couplings or synchronization devices running in an oil bath, this expulsion substance impurifies the lubricant or the oil and thus acts bothersome and functionally hindering by, for example, penetrating the bearing.

It is thus the object of the invention to further develop the known frictional couplings and synchronization devices with closed systems in such a way that the identified disadvantages of the known embodiments can be avoided through continuous uninhibited function and the operation in the new condition can be facilitated. Especially, the so-called green shiftability of the gear train in synchronization device should be improved.

SUMMARY OF THE INVENTION

The invention solves this problem in that a wear-material made of paraffin or wax is applied between the base body and the counter-body onto at least one part of the surface facing the other coupling body, which material, prior to starting to operate the frictional coupling, keeps the base body, especially the frictional layer, from being in contact with the counter-body and closes it for a short time in the first operation during the frictional contact between the coupling bodies through the appearing frictional forces and the generated temperature. The wear-material to be used according to the invention does not form any particle-shaped expulsion substance which could hinder the function of the bearing or even of the synchronization device and, after its removal, it can be dissolved from the coupling body or bodies completely into the oil or the lubricant, so that there is no fear of negative effects.

Wax exhibits, for example, high adhesion also on smooth surfaces such as steel and can be penetrated, which is advantageous especially for tight application onto sinter materials. Paraffin is similar. Wax and paraffin are also wettable and have a low heat conductivity. Both materials effect, for a limited time, a reduction of the frictional number in the frictional contact, so that, in a simple manner, the frictional number-reducing effect of the applied wear-materials with the reduction of the frictional number in the frictional contacts can be adjusted to the desired operational level.

The coupling bodies coming into frictional contact in the switching-on of the coupling are kept apart by the wear-material arranged between them already during transport and during the installation of the coupling, so that they are not clamped or damaged at the edges, even if they are pressed or hit against one another. Also in the initial operation of the frictional coupling, the frictional surfaces of the coupling bodies are, at first, for a short time, kept out of frictional contact, for the purpose of which the wear-material preferably has a height or thickness which is sufficient to keep the coupling bodies safely apart over their entire circumference. They only slowly come gradual contact upon gradual wearing-out of the wear-material, upon which the larger areas of the unevenness of the surfaces from the manufacturing are smoothened. The so-called green shiftability of a new frictional coupling or of a new synchronization mechanism is thereby substantially facilitated. After a series of shifting processes, the wear-material is entirely eliminated and the frictional surfaces are smoothened to the extent that smooth usage and the normal operation of the frictional coupling is ensured.

In a further embodiment of the invention, the melting point of the wear-material is lower than the melting point of the material of coupling bodies coming into frictional contact, especially of the frictional material and the phase change of the wear-material from solid to liquid lies within the temperature range which appears in the demand on the used frictional pair, wherein the wear-material melts away due to the appearing frictional temperature.

According to the invention, however, also the shearing strength of the wear-material can be smaller than the shearing strength of the material of the coupling bodies coming into frictional contact, especially of the used frictional material, wherein the wear-material is sheared off upon demand placed on the used frictional pairs through the appearing frictional forces. In both cases, a relatively rapid elimination of the wear-material is guaranteed, so that the frictional surfaces of the coupling bodies grip one another completely.

Appropriately, the wear-material has a low heat conductivity. These wear-resistance materials can be advantageously applied onto all frictional materials and also onto the rest of the surfaces of the coupling bodies, especially onto the counter-surface working together with the frictional layer.

The frictional layer applied onto the carrier surface of the base body can consist of sprinkling sinter material. The advantageous frictional characteristics of the material are known; besides this, the sprinkling sinter material has, due to its porosity, a special suitability for application of a wear-material, especially of paraffin or wax. It is, however, also possible to use a frictional layer which consists entirely or partially of organic material and, in all cases, with a resin-binding agent. Equally suitable is a frictional layer made of spurted-up metal such a brass or molybdenum for the application of the wear-material, wherein, in all cases, practically the same initially-mentioned advantages are achieved.

The wear-material itself can be introduced between the coupling bodies in different ways and in different arrangements. One possibility according to the invention consists of distributing the wear-resistance material in dot- or stripe-shaped arrangement onto the surface of one or more coupling bodies, especially of the frictional layer. In the case of a frictional layer with grooves, according to a further characteristic of the invention, at least one part of the wear-resistance material can be arranged dot- or stripe-shaped in the grooves of the frictional layer. Furthermore, provided is that stripe-shaped wear-material is arranged on their surfaces as leaning against the middle axis of the coupling body or bodies. According to a further variation of the invention, the wear-material can finally arranged as unequally distributed over the surface of the coupling body or bodies, optionally in a random body shape and with random surface expansion. The individual types of arrangements can also be combined with one another.

Within the scope of the invention it is thus possible to choose the wear-resistance material as corresponding to the individual requirements and depending on the properties of the material of the coupling bodies as well as of the frictional layer, wherein also the time frame can be specified within which the wear-material is completely worn down.

In comparison to the total frictional surface of the frictional layer, also the surface expansion of the wear-material used has an influence on the wear-down time. According to the invention, the total surface of the wear-material is only a fraction of the total frictional surface of the frictional layer. This has proven to be sufficient to keep apart long enough the surfaces of the coupling bodies coming into frictional contact, until a light usage of the coupling is achieved. Moreover, in doing so, an undesired change in the properties of the lubricant in the closed system can be largely avoided.

According to a further embodiment of the invention, the coupling bodies can finally be arranged as flat disks, of which at least one is provided with a frictional layer on one side, wherein the wear-material is arranged between the disks. The embodiment is especially suitable in, for example, the shifting brakes in automatic mechanics of motorized vehicles.

The invention includes embodiments in which the wear-material is arranged on surfaces of the coupling bodies which, in the engagement of the coupling, do not come into direct frictional contact with the other coupling body. This has to be arranged only in such a way that, prior to engagement of the coupling, it keeps apart the surfaces of the coupling parts that are to come into frictional contact. The elimination of the wear-material occurs then through the partial shearing-of during engagement of the coupling, until the frictional grip into one another. A residue, which does not impair the functioning of the coupling, is then melted away in the warming-up of the coupling during operation. In synchronization devices of gear mechanisms, which usually operate in the oil bath of the mechanism, the wear-material is taken up by the oil of the mechanism. Therefore, it has to be created in such a way that it does not negatively influence the properties of the oil. Further details and advantages of the invention can be seen from the accompanying drawings taken with the following discussion.

BRIEF DESCRIPTION OF THE DRAWINGS

FIGS. 1 to 4 show each one embodiment of the invention by means of synchronization device, of which each one axial middle section through the upper half of the coupling bodies is shown.

DETAILED DESCRIPTION OF THE PREFERRED EMBODIMENTS

Figure 5:
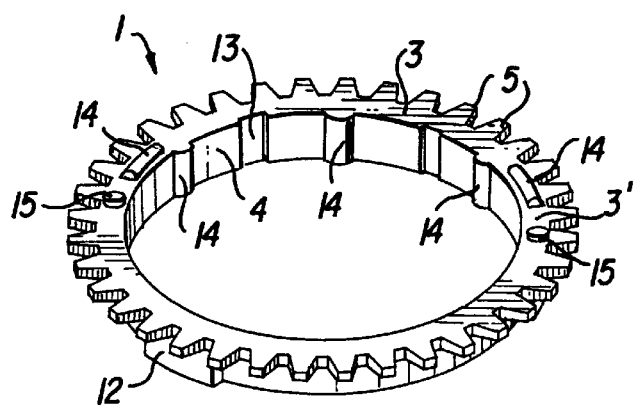
FIGS. 5 to 7 show frictional rings as coupling bodies in a perspective top view.
Figure 8:
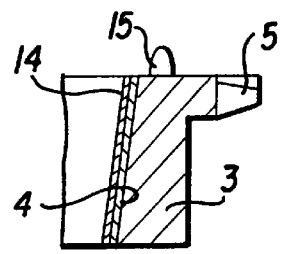
FIGS. 8 to 11 show cross-sections through the frictional rings with different arrangements of the wear-material.

The frictional coupling of synchronization devices as shown in FIGS. 1 to 4 consist each of two coupling bodies 1 and 2, from which the coupling body 1 is arranged as a frictional ring with a base body 3. This has a frictional layer 4 and gear teeth 5 which serve for the gripping of a not-shown coupling box for the shifting of the gears of the gear mechanism. The coupling body 2 is formed from a gear wheel with a gear ring 6 and gear teeth 7 for the coupling box and serves a counter-body 8 for the base body 3 with a counter-surface 9 which works together with frictional layer 4 of the base body 3.

Between the base body 3 and the counter-body 8 in each of the four embodiment examples, wear-material 10 is arranged on a surface each facing the other coupling body. This is located, according to FIG. 1, on the frictional layer 4 of the base body 3. In the embodiment according to FIG. 2, the wear-material 10, in contrast, is arranged on the counter-surface 9 of the counter-body 8. Also in the embodiment example according to FIG. 3, the wear-material 10 is fixed onto the counter-body 8, namely on a lateral surface 11' of a extension 11 protruding radially outward which carries the gear teeth 7. The wear-material 10 is located there opposite the frontal surface 3' of the base body 3 and comes into contact with this surface 3' in the sliding of the base body 3 for the engagement of the gear. FIG. 4, finally, shows an embodiment in which the wear-material 10 is arranged on the mentioned frontal surface 3' of the base body 3 opposite the extension 11 of the counter-body 8.

Figure 6:
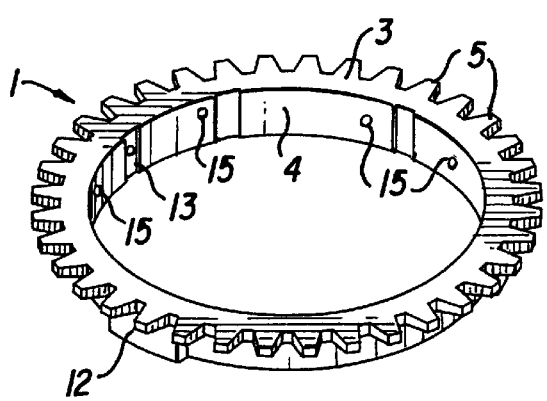
Figure 9:
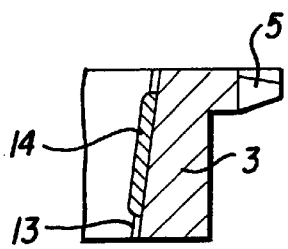
Figure 7:
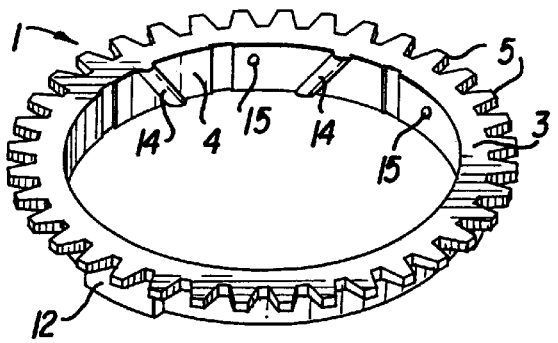

FIGS. 5 to 7 and the corresponding sectional diagrams of FIGS. 8 to 11 show various arrangements and form structures on the wear-material arranged on the coupling body 1. The coupling body 1 is arranged in these embodiment examples as a frictional ring with a base body 3 which, at its inner circumference, has a conical carrier surface with a frictional layer 4 and, at its outer circumference, has gear teeth 5. Also, there are carrier cams 12 provided at its outer surface. The frictional layer 4 has radially extending grooves 13.

Figure 10:
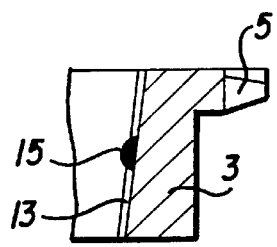
Figure 11:
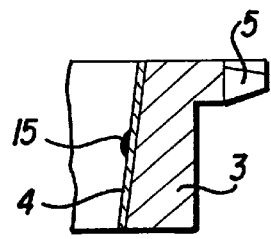

In the embodiment example, according to FIG. 5, there are cylindrical wear-resistance bodies 14 with semicylindrical cross-section distributed over the frictional layer 4 and also on the frontal surface 3' of the base body 3. On the frontal surface 3' there are also semi-spherical or conical wear-bodies 15 which, like the wear-bodies 14, can also be seen in FIG. 8. According to FIG. 9, a cylindrical wear-body 14 is arranged in a groove 13 of the frictional layer 4 applied onto the base body 3. It can be seen in FIG. 6 that, on the frictional layer 4 of the base body 3, semi-spherical frictional bodies 15 are distributed, of which one is arranged in the groove 13, as can be seen in FIG. 10. FIGS. 7 and 11 show finally an embodiment example in which the wear-resistance material is arranged on the frictional layer 4 of the base body 3. In FIG. 7, cylindrical wear-bodies 14 can be seen which lean against the middle axis of the base body 3 forming the coupling body, as well as semi-spherical wear-body 15 which rest on the frictional layer 4, as is shown especially in FIG. 11.

In all of the embodiment examples, the wear-material 10 or the wear-bodies 14 and 15 arranged as unevenly distributed over the individual surfaces of the base body 3. However, also embodiments with evenly distributed wear-bodies of the same or a different form are possible. In all of the embodiment examples, the wear-material serves to keep apart the surfaces of the coupling bodies 1 and 2 which work together in the frictional arrangement prior to starting the operation of the coupling, namely during transport, during installation and prior to the engagement of the coupling, so that they cannot be clamped or stuck together. The wear-material ensures therefore the simple and trouble-free usage of the frictional coupling also in the new condition and thereby improves the green shiftability of the same.

I claim:

1. A frictional coupling, comprised of: at least two coupling bodies (1,2), which come into frictional contact upon engagement of the frictional coupling, a first of the two coupling bodies having a ring-shaped base body (3) made of metal with at least one flat, conical or cylindrical carrier surface, a frictional layer made of organic or inorganic frictional material (4) is attached to said at least one carrier surface, and a second of the two coupling bodies having a counter body (8) made of metal, and having a counter surface which works together with the frictional layer, a wear material (10, 14 15) made of paraffin or wax is applied between the base body (3) and the counter-body (8), onto at least one part of the surface (4, 9, 11', 3') facing the other coupling body (1,2), the wear material (10, 14, 15) keeps the base body (3) and the frictional layer from being in contact with the counter-body (8) and the wear material (10, 14, 15) closes the frictional coupling for a short time in a first operation during the frictional contact between the coupling bodies (1, 2) through frictional forces.

2. A frictional coupling according to claim 1, wherein a melting point of the wear material (10, 14, 15) is lower than the melting point of the material of coupling bodies (1, 2) coming into frictional contact and a phase change of the wear material (10, 14, 15) from solid to liquid is within a temperature range which appears in the demand on the used frictional pair, wherein the wear material (10, 14, 15) melts away due to a frictional temperature.

3. A frictional coupling according to claim 1, wherein a shearing strength of the wear material (10, 14, 15) is less than the shearing strength of the material of the coupling bodies (1, 2) coming into frictional contact, wherein the wear material (10, 14, 15) is sheared off upon demand placed on the used frictional pairs through the appearing frictional forces.

4. A frictional coupling according to claim 1, wherein the wear material (10, 14, 15) has a low heat conductivity.

5. A frictional coupling according to claim 1, wherein the frictional layer (4) consists of sprinkling sinter material.

6. A frictional coupling according to claim 1, wherein the frictional layer (4) consists completely or partially of organic material, with a resin-binding agent.

7. A frictional coupling according to claim 1, wherein the frictional layer (4) consists of spurted-up metal.

8. A frictional coupling according to claim 7, wherein the spurted-up metal of the frictional layer (4) is brass.

9. A frictional coupling according to claim 7, wherein the spurted-up metal of the frictional layer (4) is molybdenum.

10. A frictional coupling according to claim 1, wherein the wear material (10, 14 15) is distributed in dot- or stripe-shaped arrangement over the surface (4, 9, 3', 11') of one or several coupling bodies (1, 2) and the frictional layer (4).

11. A frictional coupling according to claim 10, wherein in the frictional layer (4) having grooves (13) at least one part of the wear material (10, 14, 15) is arranged as dot- or stripe-shaped in the grooves (13).

12. A frictional coupling according to claim 10, wherein the stripe-shaped wear material (14) leans against the middle axis of the coupling body or bodies (1, 2) on their surface.

13. A frictional coupling according to claim 10, wherein the wear material (10, 14, 15) is unevenly distributed over the surface of the coupling body or bodies (1, 2) and has a random body shape and with random surface expansion.

14. A frictional coupling according to claim 1, wherein a total surface of the wear material (10, 14, 15) is only a fraction of the total surface of the frictional layer (4).

15. A frictional coupling according to claim 1, wherein the coupling bodies (1, 2) are arranged as flat disks, at least one of said coupling bodies is provided with the frictional layer (4) on one side and the wear material (10, 14, 15) is arranged between the disks.

* * * * *